HENRY POLLEY.
Improvement in Animal Traps.
No. 121,468. Patented Dec. 5, 1871.
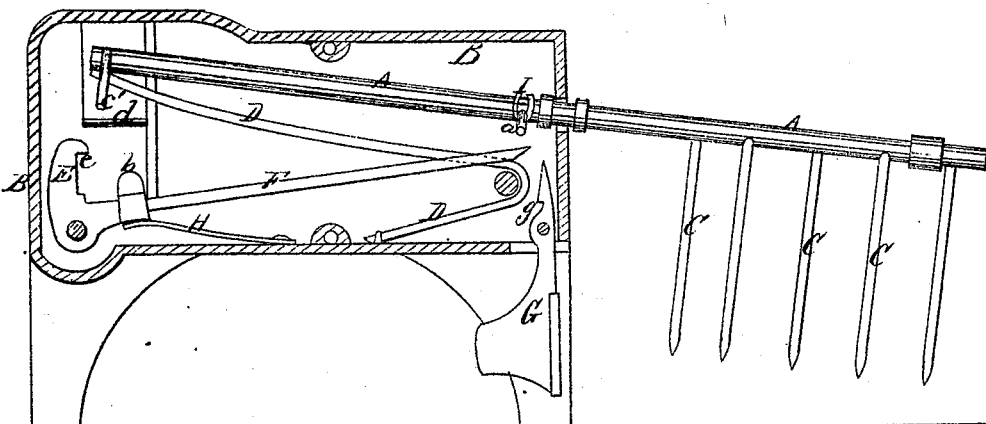
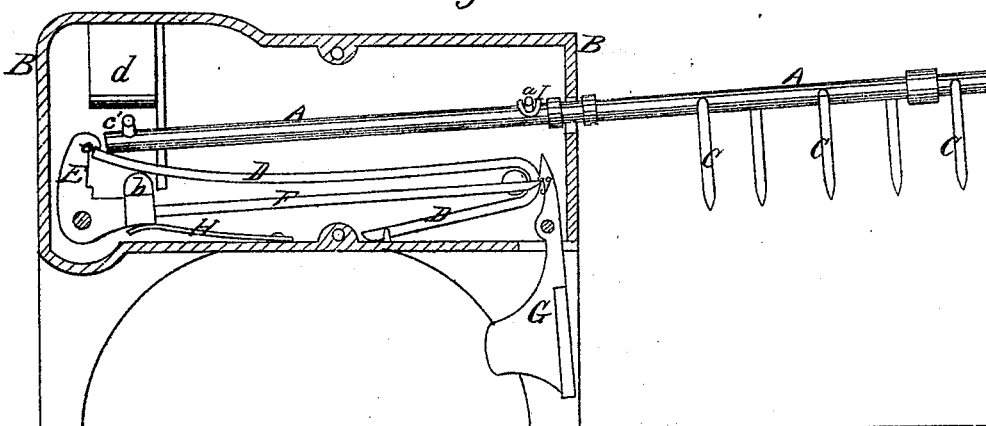
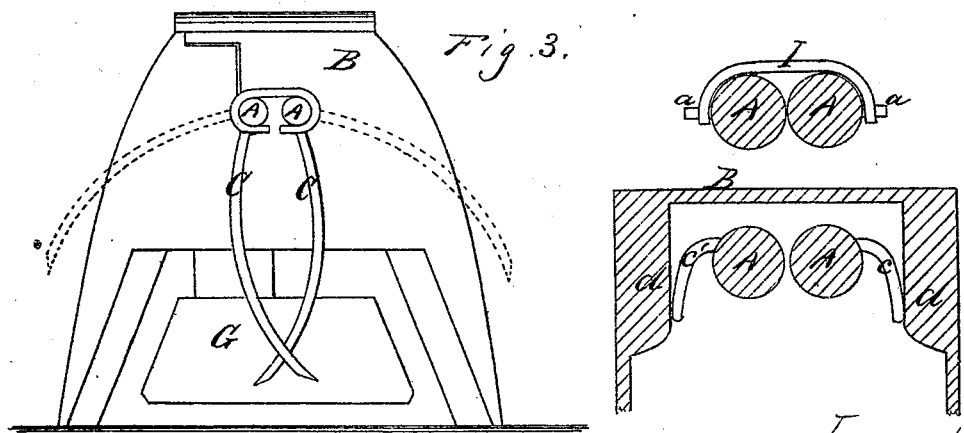
Witnesses.
Geo. H. Strong
John Smith
Inventor.
Henry Polley
By his Attys
Dewey & Co.

121,468

UNITED STATES PATENT OFFICE.

HENRY POLLEY, OF SAN FRANCISCO, CALIFORNIA, ASSIGNOR TO HIMSELF AND ISAAC JESSUP, OF SAME PLACE.

IMPROVEMENT IN ANIMAL-TRAPS.

Specification forming part of Letters Patent No. 121,468, dated December 5, 1871.

*To all whom it may concern:*

Be it known that I, HENRY POLLEY, of San Francisco, in the county of San Francisco and State of California, have invented a new and Improved Animal-Trap; and I do hereby declare that the following is a full and exact description of the same, reference being had to the accompanying drawing and to the letters of reference marked thereon.

The object of my invention is to provide an improvement in animal-traps; and it consists mainly in the employment of two bars rotating parallel with each other, and provided with a series of curved arms, which, when the trap is set, are spread apart, but which close so as to encircle or hold the body of the animal when the trap is sprung. It further consists in the employment of a suitable operating mechanism and a protecting case, within which are inclosed the springs and holding mechanism for setting and springing the trap.

In order to more fully explain my invention, reference is made to the accompanying drawing forming part of this specification, in which—

Figure 1 is a side sectional view of my trap with its working mechanism when sprung. Fig. 2 shows the trap set. Fig. 3 is an end view.

Similar letters refer to like parts.

A A are two rods or bars, which may be placed in various positions relatively to each other; but I prefer to place them parallel, side by side, and so clasped together that they can rotate about their axes independently of each other. These rods are mounted so that one end of the pair is within a conveniently-shaped protecting case, B, and the other end extends out through the end of the case, nearly horizontally, when standing on a level. The outer ends of the rods A are armed with curved prongs C, as shown plainly in Fig. 3. These prongs are spread apart or opened by rotating the rods A, and closed by turning them in an opposite direction.

I will now proceed to describe the mechanism which I have adopted for this purpose: The rods A extend to near the rear of the box B, and have a motion up and down in the holes through which they pass in the end of the box. A spring, D, is secured beneath the rods, and by its force throws the rear ends to the upper part of the box, the outer ends going down. When the trap is to be set the outer ends of the rods are lifted, which forces the spring down, and it is retained by a notch, c, in the short lever-arm E of the bell crank-lever. The long arm F extends toward the front of the box, and this arm is pressed down by the compressing of the spring D so that it catches a notch at the upper end of a weighted plate, G, this plate projecting below the bottom of the box B. The spring H throws the arm F up when the plate is moved back, and this releases the rear of the spring D, which operates on the rods A. The rods A have two pins, a a, standing out, as shown, within the box and near the hole where the rods pass out. A short spring or elastic rubber, I, is connected to these pins above the rods so that its contraction tends to rotate the rods outward and open the prongs C for the purpose of adjusting them. Near the rear end of the rods A are two arms, c' c', which project out in such a manner that when the trap is closed these arms rest against lugs d on the sides of the box, and thus forcibly close the prongs and prevent them from separating; but when the trap is set these arms stand opposite a wider place, which allows them to be spread apart by the action of the spring I, and thus the prongs can be opened more or less independently of the other movements, so as to accommodate them to any-sized hole. The trap is set by holding it down with one hand and lifting up the outer ends of the rods A with the other. This action depresses the inner ends of the rods, the hole in the side of the box acting as a fulcrum. As the inner ends are depressed the spring D yields until it touches the lug b on the bell-crank lever, and this draws the short arm E forward so that the notch e holds the end of the spring, as in Fig. 2. The pressure of the spring D upon the lug b also depresses the long arm F of the bell-crank lever until its outer end is caught by the notch g in the weighted plate G, the weight insuring this result. As the inner ends of the rods A are depressed the arms c' c' will be carried down below the narrow space caused by the lugs or projections d on the sides of the box, and this allows the spring I to act and rotate the rods A outward, and thus open or spread apart the prongs C. The trap being set, it is possible to close the prongs more or less to accommodate the device to any hole into which it is thrust, this movement being entirely independent of the setting mechanism. The animal approaching the trap from the interior of the hole will touch the plate G either to obtain a bait which is placed behind it or, if it be a gopher, to endeavor to close the hole. In either case the trap is sprung and the animal is clasped by the prongs C, which are made to close by the action of the lugs $a$ on the arms $c'\ c'$, when the spring throws up the inner ends of the rods A. By this means the animal can be caught and killed without destroying the skin, which is often valuable.

An important feature in this trap is that the animal in approaching it does not have to enter or go upon any part of it.

Having thus described my invention, what I claim and desire to secure by Letters Patent is—

1. The spring D and the notched bell-crank lever E F, together with the holding plate, substantially as herein described.

2. The pins $a\ a$ with the connecting-spring I above the rods, substantially as and for the purpose described.

3. The arms $c'\ c'$ on the rods A A and the operating lugs $d$ for closing and holding the prongs, substantially as described.

4. An animal-trap having the parallel rods A with their prongs C or equivalent devices, together with the opening and closing mechanism for the holding-prongs, as shown, and the setting and springing device, the whole constructed and operating substantially as herein described and for the purpose set forth.

In witness whereof I have hereunto set my hand.

HENRY POLLEY.

Witnesses:
GEO. H. STRONG,
E. McQUESTEN.

(143)